United States Patent [19]

Suzuki et al.

[11] Patent Number: 4,760,910
[45] Date of Patent: Aug. 2, 1988

[54] ALIGNING AND FEEDING APPARATUS FOR ELONGATED PIECES

[75] Inventors: Masanori Suzuki, Kariya; Yasuo Hibi, Obu; Kazuaki Tanaka; Yoshimitsu Yamaguchi, both of Anjo, all of Japan

[73] Assignee: Nippondenso Co., Ltd., Kariya, Japan

[21] Appl. No.: 3,275

[22] Filed: Jan. 14, 1987

[30] Foreign Application Priority Data

Jan. 16, 1986 [JP] Japan .................................. 61-5085

[51] Int. Cl.⁴ ............................................. B65G 47/24
[52] U.S. Cl. .................................... 198/412; 198/441; 198/457; 198/467.1; 198/663; 198/676
[58] Field of Search ..................... 198/412, 467.1, 408, 198/411, 415, 663, 457, 676, 481.1, 438, 441, 410, 598

[56] References Cited

U.S. PATENT DOCUMENTS

| 3,365,046 | 1/1968 | Morris et al. ......................... 198/412 |
| 3,467,237 | 9/1969 | Hanekamp et al. .................. 198/415 |
| 3,483,959 | 12/1969 | Reiley .............................. 198/457 X |
| 3,602,357 | 8/1971 | Schubert ............................ 198/438 |
| 3,667,587 | 6/1972 | Preston ............................. 198/457 X |
| 3,825,105 | 7/1974 | Cristiani ........................... 198/457 X |
| 4,561,534 | 12/1985 | Nalbach ........................... 198/411 X |
| 4,625,499 | 12/1986 | Yamaguchi et al. ................. 53/542 |

FOREIGN PATENT DOCUMENTS 77669 8/1919 Fed. Rep. of Germany ... 198/663 X
49-3581 1/1974 Japan.

Primary Examiner—Robert J. Spar
Assistant Examiner—Jennifer L. Doyle
Attorney, Agent, or Firm—Cushman, Darby & Cushman

[57] ABSTRACT

An apparatus for aligning and feeding elongated pieces, having a rotary drum which is provided on one side of a passage of the elongated pieces extending in the lengthwise direction thereof and which is rotatable about an axis parallel to the passage. The drum has peripheral receiving grooves spaced from one another at a constant pitch. A pushing cam is located in front of the drum to push the elongated pieces into the receiving grooves of the drum one by one. Below the drum are provided threaded shafts having spiral grooves for receiving the elongated pieces from the drum and conveying them in a direction perpendicular to the axis of the rotation of the drum. An aligning wall is provided on one side of the threaded shafts to align the elongated pieces during the conveyance thereof.

14 Claims, 3 Drawing Sheets

ALIGNING AND FEEDING APPARATUS FOR ELONGATED PIECES

BACKGROUND OF THE INVENTION

1. Field of the Invention

The present invention relates to an apparatus for aligning elongated pieces with a long length relative to a width thereof, in a direction perpendicular to the lengthwise direction of the elongated pieces and successively feeding the elongated pieces into a device for feeding the elongated pieces to a predetermined location.

2. Description of the Related Art

Tubular pieces having a predetermined length for a radiator of an automobile or a heater core of a heat exchanger are usually made by successively cutting a tubular blank made of an elongated metal sheet cut to a predetermined length by a cutting device. The cut tubular pieces are successively fed in the longitudinal direction while being guided by a guide means. In order to automatically feed the tubular pieces into a receiver, the tubular pieces, which are successively fed in the longitudinal direction thereof from the cutting device, must be aligned in a direction perpendicular to the longitudinal direction of the pieces, to enable the tubular pieces to be automatically and successively fed to, for example, a core assembling machine.

Japanese Examined Utility Model Publication (Kokoku) No. 49-3581 discloses an apparatus for aligning and feeding elongated pieces.

In this known apparatus, a loading device (hereinafter referred to as a receiver) having aligning guides is provided on one side of a passage of the elongated pieces (tubular pieces), which extends in the longitudinal direction of the tubular pieces, and a pushing mechanism is provided on the opposite side of the passage to directly and successively push the pieces, when the pieces come in front of the receiver.

However, in this known apparatus, since the tubular pieces moving in the longitudinal direction thereof are directly pushed into the receiver by the pushing mechanism, which is in the form of a swingable lever, the tubular pieces forced into the receiver collide with the aligning guides at the longitudinal edges of the pieces, due to inertia, and are then rebounded therefrom in the opposite longitudinal direction, especially when the feed rate of the elongated pieces is high, e.g., about 50 m/min. This rebound causes a misalignment of the tubular pieces, especially at the longitudinal edges thereof.

Furthermore, since the tubular pieces are successively forced into the receiver by the swingable lever, if the rate at which the pieces are pushed by the swingable lever exceeds 10 pieces/sec., the tubular pieces may be deformed by the pushing force, and thus the pieces fall out of the receiver because of the elasticity given thereto, making it difficult to push the tubular pieces into the receiver.

SUMMARY OF THE INVENTION

Therefore, the primary object of the present invention is to provide an apparatus for accurately aligning and feeding elongated pieces, such as tubular pieces, into for example, a receiver, even when the elongated pieces are fed in the longitudinal direction thereof at a relatively high rate or when the elongated pieces are forced into a receiver at a relatively high rate, wherein the longitudinal edges of the elongated pieces are aligned.

To achieve the object of the present invention, there is provided an apparatus for aligning and feeding elongated pieces which move in the longitudinal direction thereof, comprising a rotary drum provided on one side of a passage of the elongated pieces extending in the lengthwise direction of the elongated pieces, and rotatable about an axis parallel to the passage, the drum being provided, on its outer periphery, with a plurality of receiving grooves which are spaced from one another at a constant pitch and which extend parallel to the axis of the rotation of the drum, means for pushing the elongated pieces into the receiving grooves of the drum one by one from the passage, means for preventing the elongated pieces from falling out of the receiving grooves of the drum, means for receiving the elongated pieces from the receiving grooves of the drum and conveying the pieces in a direction perpendicular to the axis of the rotation of the drum, and means for aligning the elongated pieces during the conveyance thereof by the receiving and conveying means.

With the above arrangement, the elongated pieces which are conveyed in the longitudinal direction thereof in the passage are successively pushed into the receiving grooves of the drum one by one, and accordingly, the elongated pieces are prevented from deforming or falling out of the receiving grooves when pushed into the corresponding receiving grooves of the drum. Since the transfer of the elongated pieces from the passage into the receiving grooves of the drum takes place during the rotation of the drum, the elongated pieces have an inertia in the receiving grooves in the longitudinal direction thereof, if the elongated pieces are moved along the passage in the longitudinal direction at a high speed. Because of this inertia, the elongated pieces may not be in a constant position in the receiving grooves. However, any irregularity in the position of the elongated pieces in the receiving grooves can be compensated by the aligning means, which is preferably in the form of a aligning guide wall with which the elongated pieces come into contact at the elongated ends of the elongated pieces, so that the latter can be aligned during the conveyance by the receiving and conveying means, which is preferably in the form of a threaded shaft.

The transfer of the elongated pieces from the receiving grooves of the drum into the threaded shaft takes place during the rotation of the drum and the threaded shaft. Since the direction of the movement of the elongated pieces in the receiving grooves is substantially identical to the direction of the movement of the elongated pieces in a spiral groove provided on the threaded shaft, when a discharging position is reached, in which the elongated pieces are discharged from the receiving grooves of the drum into the spiral groove of the threaded shaft, the transfer of the elongated pieces from the receiving grooves into the spiral groove can be smoothly effected, even if the transfer operation is effected at a high speed.

Accordingly, the elongated pieces which are successively conveyed in the longitudinal direction thereof can be aligned and fed to a subsequent station, such as the receiver, without fail, even under the conditions of an increased rotational speed of the drum and an increased feeding speed of the elongated pieces.

BRIEF DESCRIPTION OF THE DRAWINGS

The invention will be now described in detail with reference to the accompanying drawings, in which.

DESCRIPTION OF THE PREFERRED EMBODIMENTS

Figure 1:
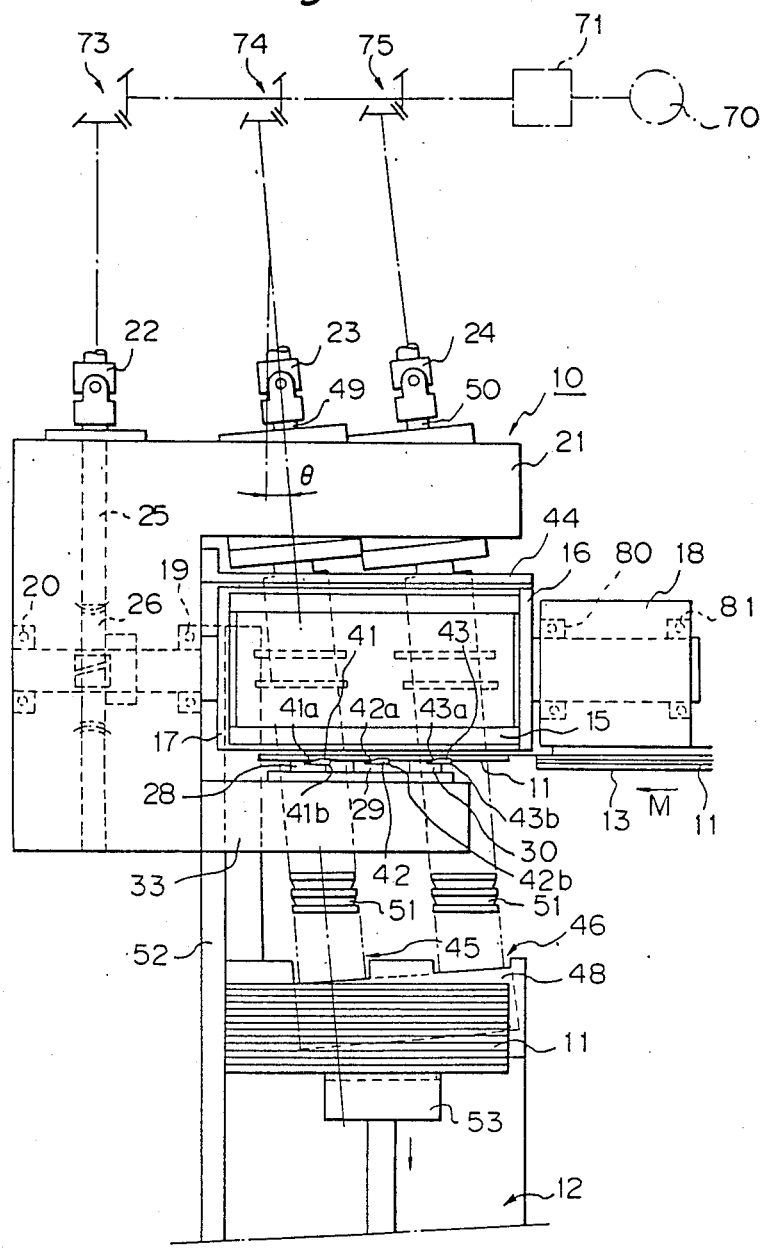
FIG. 1 is a schematic plan view of an aligning and feeding apparatus according to the present invention.

FIGS. 1 to 4 show an embodiment of the present invention by way of an example. The aligning and feeding apparatus of the present invention is designated generally at 10 in the drawings. The apparatus can be used to align and feed hollow flat tubular pieces 11 which can be used in a radiator of an automobile or heater core or the like, into a receiver 12.

The receiver (loading device) 12 to which the subject of the present invention is not directly related is described in detail in, for example, U.S. Ser. Nos. 751,237, 751,238, or 751,730. The tubular pieces 11 can be made by a tube manufacturing device (not shown) in which an elongated metal sheet is deformed to produce a tubular blank. The tubular blank is fed in the longitudinal direction thereof. During feeding of the tubular blank, it is subject to necessary treatments, such as plating, and is then cut to successively produce tubular pieces 11 having a predetermined length. The tubular pieces 11 thus obtained are guided and fed along the passage in the longitudinal direction M of the tubular pieces 11 by and on a guide plate 13 into the aligning and feeding apparatus 10.

The preceding station located upstream of the apparatus 10 is also disclosed in the above mentioned U.S. applications. The subject of the present invention is directed to the aligning and feeding device of the elongated pieces when discharged from the preceding station.

Figure 3:
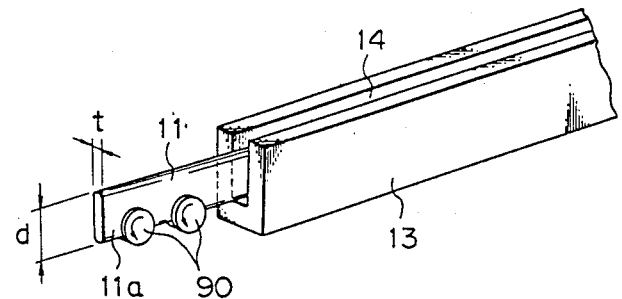
FIG. 3 is a perspective view of a tubular piece, and a guide plate in which the tubular piece is located.

As can be seen from FIG. 3, the tubular pieces 11 have a generally oval or elliptical cross section, and the guide plate 13 has a generally U-shaped elongated guide channel 14 corresponding to the tubular pieces 11, so that the tubular pieces 11 can be fitted in the guide channel 14 of the guide plate 13.

As can be seen in FIG. 1, the apparatus 10 has a rotary drum 15 provided on one side of an extension of the passage, which can rotate about an axis O parallel to the longitudinal direction M along which the tubular pieces 11 are fed from the guide plate 13. The drum 15 is connected to drum retainer 16 at one end thereof, and to a drum retainer 17 at the opposite end thereof. The drum retainer 16 is rotatably supported by a support 18 through bearings 80, 81. The drum retainer 17 is rotatably supported by a gear box 21 through bearings 19, 20.

The apparatus 10 has three, preferably uniform, universal joints 22, 23, and 24, which are connected to a drive mechanism 70 (e.g., motor) through a reduction gear 71 and gear trains (bevel gears) 73, 74, 75, respectively, so that the drive mechanism 70 rotates synchronously with the cutting device mentioned above.

The joint 22 is connected to a worm 25 which is rotatably supported by the gear box 21. The worm 25 is engaged by a worm wheel 26 secured to the drum retainer 17, so that when the worm 25 is rotated by the drive mechanism 70, the rotation of the worm 25 is transmitted to and reduced by the worm wheel 26, and is then transmitted to the rotary drum 15 through the drum retainer 17.

Figure 2:
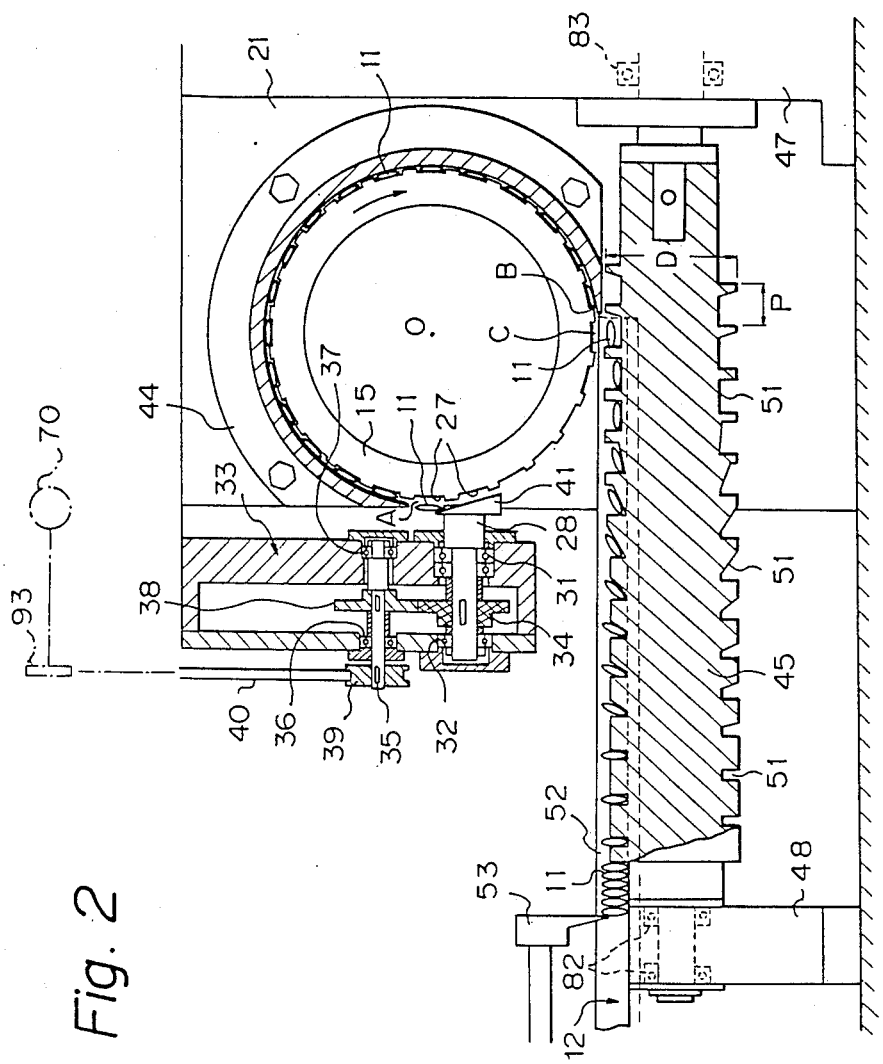
FIG. 2 is a partial longitudinal sectional view of the apparatus shown in FIG. 1.
Figure 4:
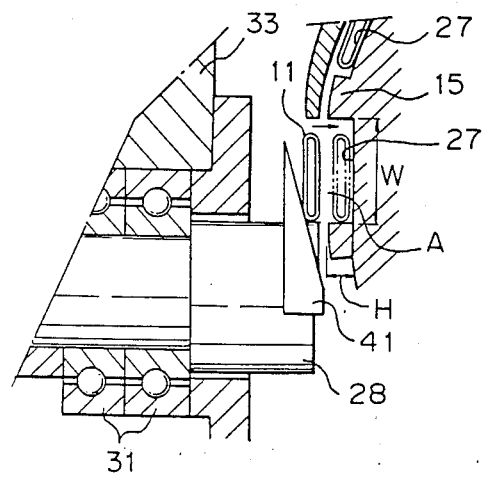
FIG. 4 is an enlarged partial sectional view of the apparatus shown in FIG. 2; and, FIG. 5 is an enlarged perspective view of a pushing cam provided on a rotary shaft shown in FIG. 4.

As shown in FIG. 2, the drum 15 is provided, on the outer periphery thereof, with a plurality of receiving grooves 27 which extend in a direction parallel to the axis O of the drum 15. The grooves 27 are circumferentially spaced from each other at an equidistance, i.e., at a constant pitch. The grooves 27 receive the tubular pieces 11 which are discharged from the front end of the guide plate 13. As shown in FIG. 4, the receiving grooves 27 have a depth H which substantially corresponds to a thickness t (FIG. 3) of the tubular pieces 11, and a width W which substantially corresponds to or is slightly larger than a width d (FIG. 3) of the tubular pieces 11, so that the tubular pieces 11 can be loosely fitted in the receiving grooves 27. The axial length of the receiving grooves 27 can be determined in accordance with the length of the tubular pieces 11. Preferably, the grooves 27 have a length equal to or longer than the length of the longest tubular pieces 11, which have different lengths depending on the usage thereof.

Alternatively, if the grooves 27 have opposite open ends, in which the tubular pieces 11 project outward from opposite end faces of the drum 15 through the open ends of the grooves 27, the length of the grooves 27 can be shorter than the length of the tubular pieces 11.

The apparatus 10 has a supporting means for supporting lower portions 11a (FIG. 3) of the tubular pieces 11 discharged from the guide plate 13 in the longitudinal direction M (FIG. 1).

The supporting means is in the form of three parallel rotary shafts 28, 29, and 30 (FIG. 1), which have peripheral surfaces defining a supporting surface of the tubular pieces 11. Namely, the tubular pieces 11 discharged from the front end of the guide plate 13 are supported on the rotary shafts 28, 29, and 30 at the lower ends 11a of the tubular pieces 11 and come to a position in front of the rotary drum 15, where the tubular pieces 11 are opposed to and face the drum 15. The tubular pieces 11 can be conveyed in the longitudinal direction M from the guide plate 13, by, for example, roller conveyers 90 (FIG. 3) or the like. When the tubular pieces 11 are positioned front of the outer peripheral surface of the drum 15, the pieces 11 can be forced into the corresponding grooves 27, which will be described hereinafter.

As is apparent from FIG. 2, the rotary shaft 28 (or 29 or 30) is rotatably supported by a gear box 33 through bearings 31 and 32, and the shaft 28 has a gear 34 secured thereto. A supporting shaft 35 parallel to the shaft 28 is rotatably supported by the gear box 33 through bearings 36 and 37 and has a gear 38 which is in mesh with the gear 34 of the shaft 28. The supporting shaft 35 has, at its outer end, a pulley 39 connected to a pulley 93, which is connected to the drive mechanism 70 through a belt 40. The remaining two shafts 29 and 30 can be connected to the drive mechanism 70 in a manner to the linkage between the shaft 28 and the drive mechanism 70. Alternatively, it is possible to connect to the gear 34, gears (not shown) of the shafts 29 and 30 corresponding to the gear 34, so that the three shafts 28, 29, and 30 rotate synchronously in the same direction.

Figure 5:
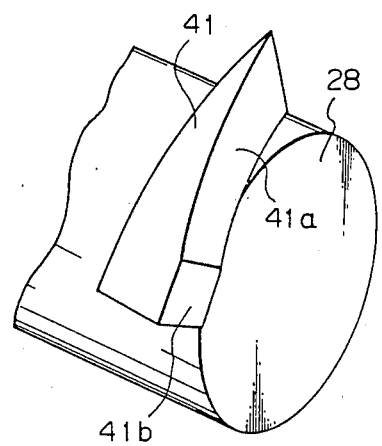

The rotary shafts 28, 29 and 30 are provided, on their outer peripheries, with pushing cams 41, 42, and 43 (FIG. 1) secured thereto, which are adapted not only to support the side faces of the tubular pieces 11 which are brought onto the shafts 28, 29 and 30 in order to prevent the tubular pieces from falling down, but also to push the tubular pieces 11 supported on the rotary shafts into the receiving grooves 27 of the drum 15 when the rotary shafts rotate. Namely, the tubular pieces 11, which are successively fed from the guide plate 13, are successively forced into the corresponding receiving grooves 27 of the rotary drum 15 during the rotation of the drum 15, by the pushing cams 41, 42, and 43. The pushing cams 41, 42, and 43 have inclined cam surfaces 41a, 42a, and 43a, (FIGS. 1 and 5) which push the tubular pieces 11 toward the receiving grooves 27 of the drum in accordance with the rotation of the respective shafts 28, 29, and 30. The pushing cams 41, 42, and 43 also have flat surfaces 41b, 42b, and 43b which are connected to the inclined cam surfaces 41a, 42a and 43a and which are adapted to finally force the pieces 11 onto the bottoms of the grooves 27 of the drum 15.

The cams 41, 42, and 43 prevent the pieces 11 from accidentally deforming or falling out of the corresponding grooves 27. The shafts 28, 29, and 30 rotate synchronously with the rotation of the drum 15, so that one turn of the shafts 28, 29, and 30, and accordingly the cams 41, 42 and 43, corresponds to one pitch of the receiving grooves 27 of the drum 15. Consequently, the tubular pieces 11 can be successively forced into the grooves 27 by the cams at every turn of the shafts 28, 29, and 30.

The rotation of the shafts 28, 29, 30 corresponds to the rotation of the cutter (not shown) mentioned above. In the illustrated embodiment, the drum 15 has twenty four grooves 27 on the outer periphery thereof, and accordingly, when the shafts 28, 29, 30 rotate by one turn, the drum 15 rotates by 15 degrees (1/24 the turn).

The forward movement of the pieces 11 toward the receiver 12 is braked by the friction between the pieces 11 and the shafts 28, 29, and 30, and between the pieces 11 and the cams 41, 42, and 43. Namely, the pieces 11 can be stopped in front of the drum 15 by the aforementioned brake force. It should be noted here that the positions in which the pieces stop are not constant in the longitudinal direction, and the pieces are finally aligned before being fed into the receiver, as will be understood from the following explanation.

The drum 15 rotates in the clockwise direction in FIG. 2, and accordingly, the tubular pieces 11 which have been forced into the grooves 27 at a receiving point A in FIG. 2 are moved in the same clockwise direction and finally come to a discharging point C in which the grooves 27 with the pieces 11 are almost opposite the threads of spiral grooves 51 which will be described hereinafter and which extend in the horizontal direction.

The apparatus 10 has a circumferential guide plate or frame 44 which surrounds the drum 15 substantially between the point A and an intermediate point B which is immediately prior to point C, so that the tubular pieces 11 are prevented from falling out of the corresponding grooves 27 of the drum 15 between the points A and B during the rotation of the drum 15.

Below the rotary drum 15 are provided two parallel threaded shafts 45 and 46 which are rotatably supported by frames 47 and 48 through bearings 82, 83, and which are connected to the universal joints 23 and 24 through shafts 49 and 50 connected to the shafts 45, 46, respectively.

The threaded shafts 45 and 46, which are essentially identical, are provided, on their outer peripheries, with irregular spiral grooves 51 substantially at a constant pitch P, as can be seen from FIG. 2. The threaded shafts 45 and 46 convey the tubular pieces 11, which are received in the spiral grooves 51, in a direction perpendicular to the longitudinal axis M toward the receiver 12. The shafts 45 and 46 extend parallel to each other, in a direction which is inclined by an angle $\theta$ with respect to an axis normal to the axis O of the drum 15, as shown in FIG. 1. The inclination angle $\theta$ is determined by the following equation;

$$\theta = P/\pi D$$

wherein D is a diameter of the shaft 45 (46), and P is a pitch of the groove 51 (see FIG. 1).

As a result of this inclination of the shafts 45 and 46, each turn of the spiral grooves 51 extends in parallel with the axis O of the rotary drum 15, when viewed from above as shown in FIG. 1. At the discharging point C, in which the receiving grooves 27 of the drum 15 are pointing downward and substantially in the vertical direction, the tubular pieces 11 in the grooves 27 drop down into the spiral grooves 51 of the screw shafts 45 and 46.

When the screw shafts 45 and 46 rotate, the pieces 11 in the grooves 51 of the shafts 45 and 46 move in the direction perpendicular to the axis O of the rotary drum 15, i.e., in the longitudinal direction of the shafts 45 and 46, at the same speed as the angular displacement of the receiving grooves 27 of the drum 15. Namely, one pitch of the spiral grooves 51 in the axial direction thereof corresponds to one pitch of the grooves 27 of the drum in the circumferential direction thereof.

Since the direction of the movement of the tubular pieces 11 during the movement of the receiving grooves 27 from the point B to the point C is substantially the same as the direction of the movement of the tubular pieces 11 after they are received in the grooves 51 of the screw shafts 45 and 46, a smooth and easy transition of the tubular pieces 11 from the grooves 27 of the drum 15 into the grooves 51 of the shafts 45 and 46 takes place.

As can be seen from FIG. 2, the spiral grooves 51 of the shafts 45 and 46 have different widths. Namely, the width of the grooves 51 is substantially identical to the width W of the receiving grooves 27 of the drum, in the vicinity of the right ends (FIG. 2), of the shafts 45 and 46 in which the grooves 51 receive the tubular pieces 11 from the grooves 27 of the drum 15, and decreases toward the left ends of the shafts 45 and 46, i.e. toward the receiver 12. Also, the bottom surfaces of the grooves 51 are gradually raised or inclined upward, so that the tubular pieces 11 in the grooves 51 are gradually raised in accordance with the conveyance thereof along the axis of the shafts 45 and 46. Namely, the tubular pieces 11 lie with the longer axis of the oval or elliptical cross section of the tubular pieces 11 extending in the horizontal direction when the tubular pieces 11 are received in the grooves 51 of the shafts 45 and 46 at the receiving point C near the right ends thereof, and then the tubular pieces 11 are made to gradually rise as they are gradually moved in and along the spiral grooves 51 of the shafts 45 and 46 toward the receiver 12. The tubular pieces 11 rise and assume a substantially completely upright posture when they reach the leftmost end of the spiral grooves 51, so that the longer axis of the oval (or elliptical) cross section of the tubular pieces 11 extends in the vertical direction. Thus, the tubular pieces 11 with an upright posture are fed into the receiver 12.

As shown in FIG. 1, the apparatus 10 has an aligning guide wall 52 with which the longitudinal ends of the tubular pieces 11 come into contact to align the tubular pieces along the guide wall 52, during the conveyance of the tubular pieces 11 in the grooves 51 of the shafts 45 and 46. The guide wall 52 extends on one side of the shaft 45 or 46 and extends to the receiver 12. The tubular pieces 11 in the grooves 51 are subject to components of force, in the axial direction and in the circumferential direction, of the shafts 45 and 46 during the rotation thereof. The axial component of force causes the forward movement of the tubular pieces 11 in the grooves 51 in the axial direction, and the circumferential component of force causes the lateral movement of the tubular pieces 11 toward the guide wall 52, so that the longitudinal ends of the tubular pieces 11 come into contact with the guide wall 52 during the forward movement of the tubular pieces 11 toward the receiver 12.

Accordingly, the tubular pieces 11 are aligned by the guide wall 52, when reaching the left ends of the spiral grooves 51. The receiver 12 has a claw 53, which is located above the receiver 12 to prevent the tubular pieces 11 from falling down, in the axial direction of the shafts 45 and 46. The claw 53 supports the frontmost tubular piece 11 and moves in the left hand direction in FIG. 2 at the same speed as the tubular piece 11 in the grooves 51. The claw 53 can be driven by, for example, the drive mechanism 70, and is disclosed in detail in the aforementioned US applications.

The tubular pieces 11 which are discharged from the guide plate 13 in the longitudinal direction M can be thus aligned and fed into the receiver 12 by the rotary drum 15 and the threaded shafts 45 and 46.

According to the apparatus of the present invention, even if the tubular pieces 11 are discharged from the preceding station, i.e., from the guide plate 13, at a high rate of 50 m/min., and if the feed rate of the tubular pieces into the grooves 27, and accordingly into the grooves 51, is higher than 25 pieces/sec., the tubular pieces 11 can be smoothly and accurately fed into the receiver 12 without causing a blockage or a feed failure.

It will be easily understood that the present invention is not limited to the illustrated embodiment as mentioned above, and can be modified. For example, the shapes of the grooves 27 of the drum 15 and the grooves 51 of the threaded shafts 45 and 46 are not limited to those illustrated and can be modified. In addition, the present invention is applicable not only to tubular pieces, but also to other elongated objects to be fed.

As can be understood from the above description, according to the present invention, since the tubular pieces can be successively fed one by one into the rotary drum having receiving grooves by the pushing-in device, the tubular pieces are free from the deformation which would otherwise occur when the tubular pieces conveyed in the longitudinal direction thereof are fed into the receiver in the direction perpendicular to the longitudinal direction: also there is no possibility that the pieces will fall out of the receiving grooves of the drum.

According to the present invention, during the forward movement of the tubular pieces by the spiral grooves along the axis of the threaded shafts toward the receiver, after the tubular pieces are fed from the receiving grooves of the drum into the spiral grooves of the threaded shafts, the tubular pieces are aligned by the aligning guide prior to entering the receiver. According to the present invention, the conveyance of the tubular pieces from the grooves of the drum into the spiral grooves of the threaded shafts can be effected during the rotation of the rotary drum and the screw shafts. Since the direction of the movement of the tubular pieces in the receiving grooves at the discharging position of the pieces, where the pieces are fed from the receiving grooves of the drum into the spiral grooves of the threaded shafts, is substantially the same as the direction of the movement of the pieces in the spiral grooves, the transference of the tubular pieces from the receiving grooves into the spiral grooves can be effected without fail, even if the speed at which the pieces are transferred is increased.

Therefore, according to the present invention, the speed of the movement of the relatively long articles to be fed in the lengthwise direction thereof, and the feed rate of the elongated articles into the receiver, can be increased, thus resulting in a reduction of the time needed for assembling, for example, radiators or heat exchangers in which the elongated articles are used.

We claim:

1. An apparatus for aligning and feeding elongated pieces, comprising:
   a rotary drum which is provided on one side of a passage of the elongated pieces extending in the lengthwise direction of the elongated pieces and which is rotatable about an axis parallel to the passage, said drum being provided, on the outer periphery thereof, with a plurality of receiving grooves which are spaced from one another at a constant pitch and which extend parallel to the axis of the rotation of the drum;
   means for pushing the elongated pieces into the receiving grooves of the drum one by one from the passage, said means for pushing including at least one rotary shaft mounted in said passage adjacent said rotary drum, said rotary shaft being mounted for rotation about an axis normal to a longitudinal axis of the passage, and a pushing cam member mounted to the rotary shaft, said pushing cam having a cam surface which contacts elongated pieces moving in said passage to brake the movement of the pieces and to push the pieces in a direction normal to the direction of movement in said passage into the receiving grooves of the drum as the rotary shaft rotates;
   means for preventing the elongated pieces from falling out of the receiving grooves of the drum;
   means for receiving the elongated pieces from the receiving grooves of the drum and conveying said pieces in a direction perpendicular to the axis of the rotation of the drum; and
   means for aligning the elongated pieces during the conveyance thereof by the receiving and conveying means.

2. An apparatus according to claim 1, wherein said means for preventing the elongated pieces from falling out of the receiving grooves of the drum comprises a circumferential guide plate which partially surrounds the outer periphery of the drum.

3. An apparatus according to claim 1, wherein said means for receiving and conveying the elongated pieces comprises at least one threaded shaft which extends in a direction normal to the axis of the rotation of the drum and which is rotatable about the longitudinal axis thereof, said threaded shaft being located below the drum.

4. An apparatus according to claim 3, wherein said threaded shaft is provided, on the outer periphery thereof, with a spiral groove for receiving the elongated pieces from the receiving grooves of the drum.

5. An apparatus according to claim 4, wherein said spiral groove has a constant turn pitch and a groove shape which varies along the length thereof.

6. An apparatus according to claim 5, wherein at least a portion of a bottom surface of said spiral groove gradually rises from a first depth adjacent the drum to a second depth adjacent the end of the threaded shaft spaced from the drum.

7. An apparatus according to claim 4, wherein said means for aligning the elongated pieces comprises a guide wall which extends on one side of the threaded shaft in a direction normal to the axis of the rotation of the drum.

8. An apparatus according to claim 7, wherein said threaded shaft is inclined with respect to an axis perpendicular to the axis of the rotation of the drum, so that each turn of the spiral groove extends in parallel to the axis of the rotation of the drum, and wherein said spiral groove causes the elongated pieces received in the spiral groove to laterally move so as to bring the elongated pieces into contact with the guide wall during the conveyance of the elongated pieces in and by the spiral groove.

9. An apparatus for aligning and feeding elongated pieces, comprising:
 a rotary drum which is provided on one side of a passage of the elongated pieces extending in the lengthwise direction of the elongated pieces and which is rotatable about an axis parallel to the passage, said drum being provided, on the outer periphery thereof, with a plurality of receiving grooves which are spaced from one another at a constant pitch and which extend parallel to the axis of the rotation of the drum;
 means for pushing the elongated pieces into the receiving grooves of the drum one by one from the passage,
 means for preventing the elongated pieces from falling out of the receiving grooves of the drum;
 means for receiving the elongated pieces from the receiving grooves of the drum and conveying said pieces in a direction perpendicular to the axis of the rotation of the drum, said means for receiving and conveying including at least one threaded shaft disposed below the drum and extending in a direction normal to the axis of rotation of the drum, said threaded shaft being rotatable about the longitudinal axis thereof and being provided, on the outer periphery thereof, with a spiral groove for receiving the elongated pieces from the receiving grooves of the drum, said spiral groove having a constant turn pitch and a shape which varies along the length thereof such that said spiral groove has different width along the length thereof; and
 means for aligning the elongated pieces during the conveyance thereof by the receiving and conveying means.

10. An apparatus according to claim 9, wherein said means for preventing the elongated pieces from falling out of the receiving grooves of the drum comprises a circumferential guide plate which partially surrounds the outer periphery of the drum.

11. An apparatus according to claim 9, wherein said means for pushing includes at least one rotary shaft mounted in said passage adjacent said rotary drum, said rotary shaft being mounted for rotation about an axis normal to a longitudinal axis of the passage, and a pushing cam member mounted to the rotary shaft, said pushing cam having a cam surface which contacts elongated pieces moving in said passage to brake the movement of the pieces and to push the pieces in a direction normal to the direction of movement in said passage into the receiving grooves of the drum as the rotary shaft rotates.

12. An apparatus according to claim 9, wherein at least a portion of a bottom surface of said spiral groove gradually rises from a first depth adjacent the drum to a second depth adjacent the end of the threaded shaft spaced from the drum.

13. An apparatus according to claim 9, wherein said means for aligning the elongated pieces comprises a guide wall which extends on one side of the threaded shaft in a direction normal to the axis of the rotation of the drum.

14. An apparatus according to claim 13, wherein said threaded shaft is inclined with respect to an axis perpendicular to the axis of the rotation of the drum, so that each turn of the spiral groove extends in parallel to the axis of the rotation of the drum, and wherein said spiral groove causes the elongated pieces received in the spiral groove to laterally move so as to bring the elongated pieces into contact with the guide wall during the conveyance of the elongated pieces in and by the spiral groove.

* * * * *